US006655580B1

(12) United States Patent
Ergo et al.

(10) Patent No.: US 6,655,580 B1
(45) Date of Patent: Dec. 2, 2003

(54) SYSTEM AND METHOD FOR RENTING OR PURCHASING DIGITAL MEDIA

(76) Inventors: Michael Jared Ergo, 810 Shady Brook Ln., Fairview, TX (US) 75069; Rachel Pauline Avery, 810 Shady Brook Ln., Fairview, TX (US) 75069

( * ) Notice: Subject to any disclaimer, the term of this patent is extended or adjusted under 35 U.S.C. 154(b) by 0 days.

(21) Appl. No.: 10/188,455

(22) Filed: Jul. 2, 2002

(51) Int. Cl.[7] .............................................. G06E 17/00
(52) U.S. Cl. ....................................................... 235/375
(58) Field of Search ................................ 235/375, 380, 235/381, 383, 449; 700/234, 235, 236; 705/17

(56) References Cited

U.S. PATENT DOCUMENTS

| | | | |
|---|---|---|---|
| 4,528,643 A | | 7/1985 | Freeny, Jr. |
| 5,028,766 A | * | 7/1991 | Shah ........................... 235/381 |
| 5,088,586 A | * | 2/1992 | Isobe et al. .................. 194/205 |
| 5,130,792 A | | 7/1992 | Tindell et al. |
| 5,247,347 A | | 9/1993 | Litteral et al. |
| 5,445,295 A | * | 8/1995 | Brown ........................... 221/3 |
| 5,523,551 A | * | 6/1996 | Scott ............................ 235/381 |
| 5,633,839 A | * | 5/1997 | Alexander et al. ........... 700/234 |
| 5,794,217 A | | 8/1998 | Allen |
| 6,011,772 A | | 1/2000 | Rollhaus et al. |
| 6,330,490 B1 | | 12/2001 | Kim et al. |
| 6,338,933 B1 | | 1/2002 | Lawandy et al. |
| 6,343,063 B1 | | 1/2002 | Rollhaus et al. |
| 6,571,150 B2 | * | 5/2003 | Arai et al. .................... 700/236 |
| 2002/0074398 A1 | * | 6/2002 | Lancos et al. ............... 235/382 |

OTHER PUBLICATIONS

"Spectra Systems Corp–SpectraDisc Corp" [on–line] [Retrieved On: Apr. 17, 2002] retrieved from: http://www.spectradisc.com/ p. 1–2.
"Spectra Systems Corp–SpectraDIsc Corp" [on–line] [Retrieved On: May 7, 2002] retrieved from: http://www.spectradisc.com/ ; p. 1 of 2.

* cited by examiner

Primary Examiner—Karl D. Frech
Assistant Examiner—Edwyn Labaze
(74) Attorney, Agent, or Firm—Slater & Matsil, LLP

(57) ABSTRACT

A system and method for allowing a customer to rent or purchase a video on an optically readable medium is disclosed. In a preferred embodiment, the invention consists of a kiosk at which a customer makes a video selection and the video is written to the optically readable medium, such as a DVD, within the kiosk. By applying an opaquing layer that becomes opaque with exposure to light and/or air or due to the passage of time, the rented video becomes unreadable and the customer need not return the rented video to a video rental store. Because the video kiosk writes the video content to the DVD, the video kiosk is only limited to the number of stored blank DVDs rather than a fixed number of copies of a video as is a video rental store.

21 Claims, 7 Drawing Sheets

SYSTEM AND METHOD FOR RENTING OR PURCHASING DIGITAL MEDIA

TECHNICAL FIELD

The present invention relates generally to a system and method for renting or purchasing video disks, and more particularly to a system and method allowing a purchaser to select one movie out of many thousands and rent or purchase as many copies as desired using digital versatile disc (DVD) technology.

BACKGROUND

Upon entering a video rental store, one is faced with selecting one of perhaps several hundred video titles that the video rental store has available. Unfortunately, if one is looking for an older video or one that did receive wide circulation, one will almost certainly not find the video available. Furthermore, even if one desired a recently released video that received wide circulation, one could readily discover that all copies of the video have already been rented.

Alternatively, if one desired to purchase a video, one again faces the possibility that the desired video is either out of stock, is no longer available, or the store does not have as many copies as one desired to purchase. In many cases, one may desire renting a video prior to purchasing it. This is not readily feasible in most rental stores. Even when a video store is found that allows both rental and purchase, the rental price will almost certainly not be applied toward the purchase price of the video.

Due to the physical size required for an inventory of several thousand video titles, the number of locations available to a video rental store is necessarily limited. The cost of an inventory that includes several thousand video titles also limits the number of video rental stores.

Additional disadvantages of renting videos include the fact that the video itself must physically be returned to the video rental store. If one does not return a rented video on time, one is faced with late charges, etc. While purchasing a video allows one to watch at will, a rented video must be viewed within a very limited time period, typically 2–5 days.

Privacy and security issues are also relevant with video rentals. Typically one must be registered with a video rental store prior to renting a video. This registration may require-disclosure of personal information that some may feel uncomfortable releasing. This registration also allows the video rental store to track an individual's rentals, which may be undesirable. Frequently the registration requires credit card information to guarantee return of the rented video. Increasingly, individuals are becoming leery of providing credit card information due to potential credit card fraud or abuse.

SUMMARY OF THE INVENTION

These and other problems are generally solved or circumvented, and technical advantages are generally achieved, by preferred embodiments of the present invention that allows one to select any one of a large archive of video (or audio, gaming or software) titles for rent and/or purchase.

In a first embodiment, the present invention provides a Kiosk machine that will allow customers to browse a movie database, view movie descriptions, and then have a copy of the movie saved to a DVD disk that will erase within a predetermined time, e.g., 48 hours. The purchased disk will be able to be viewed on most home DVD players.

As an example, the machine can be a free standing machine, located in stores that are open 24 hours a day, food delivery stores, apartment communities, etc. The machine will work just like an ATM. The customer will use the touch screen to locate a movie title they would like to rent. The database will also allow the buyer to see clips of the film. Once the movie is found, the customer selects payment method, then pays. The kiosk will retrieve the movie data from the home based server. The server sends the data, then the DVD is copied onto the disk. The disk is then placed in a plastic sleeve and dispensed. The buyer will not have to return the movie, because the data will be unable to be read after 48 hours.

It is envisioned that the machine will be accessible 24 hours a day and would enable a selection of movies that is larger than any other. As an example, a pizza delivery shop can have a simplified model of the machine allowing the customer to order a pizza and their movie of choice available for delivery. This system could enable convenient sales, without late fees, memberships, credit cards or employees.

Aspects of the invention could be implemented in a number of ways. For example, a method for renting a video on an optically readable medium for receiving a request for the video to be rented. At a point of sale, the video content is written on the optically readable medium. The optically readable medium is subsequently treated with an opaquing layer designed to render the optically readable medium unreadable after a period of time. The rented video on the optically readable medium is then provided to a customer at the point of sale.

In accordance with a second embodiment of the present invention, an apparatus allowing a customer to either purchase or rent a video on an optically readable medium is disclosed. The apparatus comprises a housing in which the remaining elements are mounted. The remaining elements include means for receiving a request for the video and means for receiving payment information. Further elements within the housing are means for writing video content on the optically readable medium, means for writing sales information on the optically readable medium and means for providing the video on the optically readable medium to the customer.

In accordance with a third embodiment of the present invention, a method allowing a customer to either purchase or rent entertainment content on an optically readable medium is disclosed. The method comprises receiving both a request for the entertainment content and payment information. Entertainment content is then written on the optically readable medium at a point of sale. Time and date information is also written on the optically readable medium and then the entertainment content on the optically readable medium is provided to the customer. Upon the customer returning the optically readable medium to the point of sale, the customer is provided with a partial payment credit.

Some embodiments of the present invention. allow customers to rent a DVD from a machine utilizing both point of sale and remote databases of movies and a point of sale DVD writer. The DVD writer will utilize technology that is much faster than a DVD writer ordinarily available in the consumer market. The machine will allow customers to browse, preview, and rent DVD videos 24 hours a day. Because the DVD "self-destructs" and can be disposed of when viewed, it gives the customer the advantage of no late fees and no return trips to drop off the movie. Having video content in both point of sale and remote databases allows the customer to choose from thousands of videos almost instantly. Because the video content is stored in databases, an unlimited number of copies of each video can be rented.

Since the machine is completely automated and unmanned, it saves the operating company employee costs. Since the machine can be quite small, when compared to a video rental store, it saves the operating company rental space and upkeep costs. The operating company will also save money in operating costs such as electricity, security, etc. The operating company will also have the advantage of getting customers that a video rental store would not get due to the limited open hours, and the limited titles and quantity of movies on hand at the video rental store.

Another advantage for the operating company as well as the customer is that no membership will be required. This is advantageous for the one time buyer who does not have an established membership (e.g., an out-of-town visitor at a local hotel), as well as younger customers who have money but do not have credit cards to receive a membership. The operating company profits in both of these examples because they are receiving business that the video rental store would not receive.

Because the machine is relatively small and portable, it may be placed in many locations. Street corners, 24-hour convenience stores, apartment complexes and pizza places are all possible machine locations.

The machine could also make gift cards. These cards, similar to credit cards, could be bought and given as gifts to be redeemed at the machine. The gift cards would be used in the machine's credit card reader. The gift card can either be for a specific dollar amount or for a specific number of rentals. Restrictions can also be put on the cards as well, such as allowing only certain ratings of movies to be rented.

A further advantage of preferred embodiments of the present invention is that a customer can rent a video, and if the customer desires to keep the video, the customer may do so. The customer may thus preview a video before deciding to purchase it. If the customer does not wish to purchase the video, the customer can return the video on the optically readable medium and receive a partial credit.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

A method and an apparatus for implementing this method of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a kiosk for renting or purchasing videos on an optically readable medium, preferably a digital versatile disc (DVD). The invention may also be applied, however, to audio information (a music CD) or software (including games for game consoles).

The present invention includes a number of embodiments. In most embodiments, a kiosk is provided to prepare and sell digital media to clients at the point of sale. In one example, the kiosk is be equipped with an apparatus to coat DVDs (or other media) after they are written. The coating is designed to make the disk unreadable after a given time thereby eliminating the need for the consumer to return the disk (as with a rental) and also eliminating many of the copyright concerns of the content provider.

In one embodiment, the ordering process can be performed remotely, e.g., over the Internet or a telephone line. This provides additional convenience to the consumer by allowing the media to be prepared before the time of purchase. It also allows the system to better control the operation and availability of content (e.g., a movie will not be removed from local cache if it will be need shortly).

In yet another embodiment, the barrier layer can be eliminated by writing rental information on a portion of the media. This embodiment provides for a simpler kiosk apparatus but also requires that the media to be returned in the case of rentals.

These and other embodiments will be described in greater detail below. While described as individual embodiments, it should be clear that various aspects of different flow charts or other parts of the embodiments can be combined and/or modified. The particular embodiments described are intended to be descriptions of broad concepts rather than specific limitations.

Figure 1:
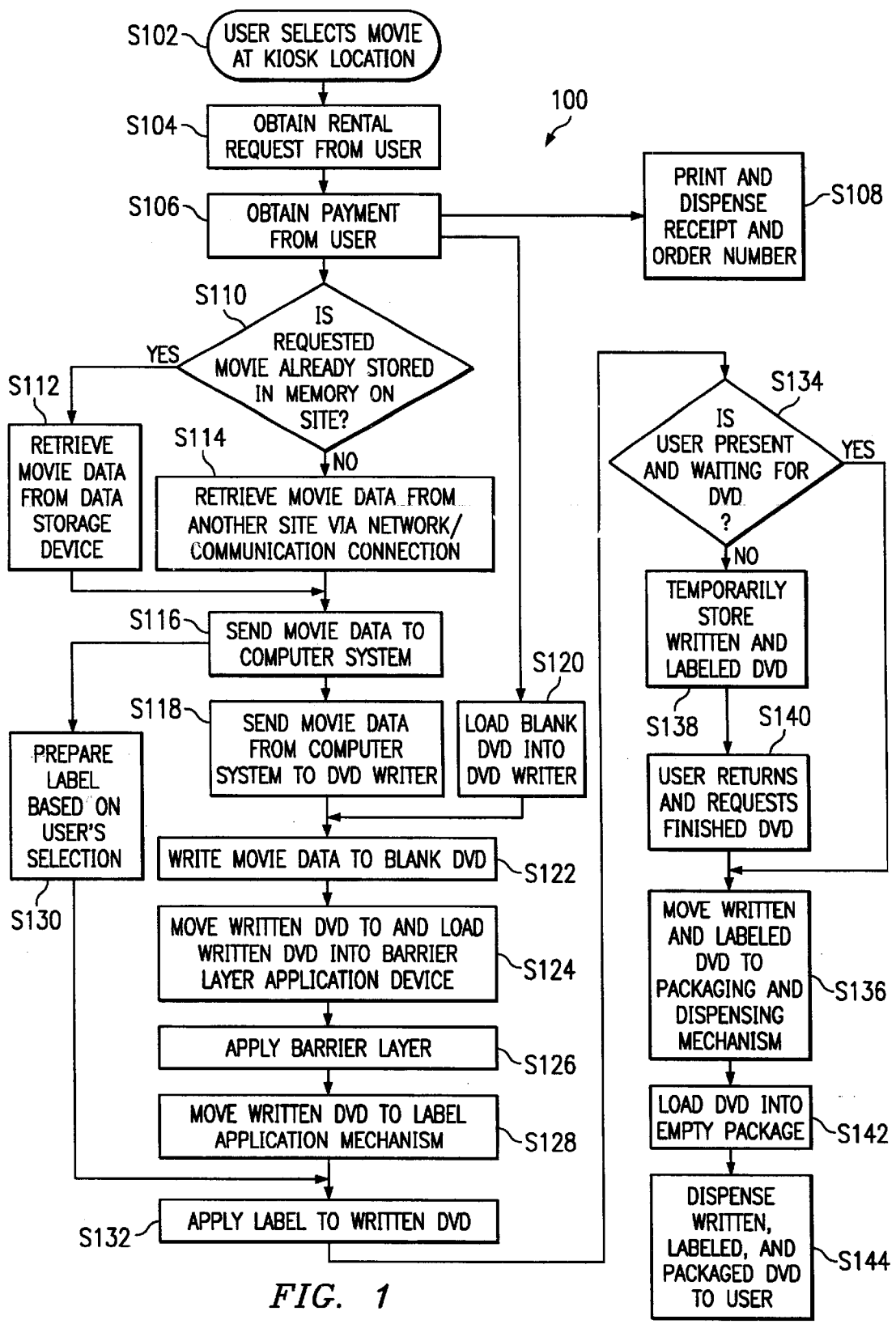
FIG. 1 is a flowchart of a first embodiment of the present invention.

FIG. 1 provides the process flow 100 for a first preferred embodiment of the present invention. In step S102, the customer selects a rental video using a kiosk (such as kiosk 500 of FIG. 5, which is discussed below). A computer system receives the rental video request from the customer in step S104. The computer system then requests and obtains payment from the customer in step S106 and prints a receipt in step S108.

The computer system determines if the video content corresponding to the selected rental video is stored on a local video content server in step S110. If the video content is stored on the local video content server, the video content is retrieved from the local video content server in step S112 and sent to the computer system in step S116. If the video content is not stored on the local video content server, it is requested from a remote video content server via a network/communication connection in step S114. The video content retrieved from the remote video content server is then sent to the computer system in step S116.

Once the computer system has received the video content, it is sent to a DVD writer in step S118. A DVD transporter retrieves a blank DVD from a blank DVD storage unit and places it in the DVD writer in step S120. The DVD writer then writes the video content on the blank DVD in step S122. The DVD transporter then transfers the written DVD to an opaquing layer application device in step S124 and an opaquing layer is applied to the DVD in step S126. The DVD transporter then moves the written DVD to a label applicator in step S128. The computer system causes an appropriate label to be prepared by a label printer in step S130 and a label applicator applies the label in step S132.

The kiosk then determines if the customer is present and waiting for the completed DVD in step S134. If the customer is present, the DVD transporter places the completed DVD in a DVD dispenser in step S136. If the customer is not present, the DVD transporter places the completed DVD in a temporary storage unit in step S138. Upon a later indication that the customer is now present as determined in step S140, the DVD transporter retrieves the completed DVD from the temporary storage unit and places it in the DVD dispenser in step S136. An empty package from an empty package storage unit is then placed upon the completed DVD in step S142. The packaged completed DVD is then dispensed to the customer in step S144.

As noted above, the customer may not be present when the DVD is completed. This may be due to several factors. As writing the DVD is not instantaneous, the kiosk may be placed in a grocery store, mall or convenience store. The customer may then proceed with grocery shopping, etc., and return to the kiosk when the grocery shopping is completed and receive the completed DVD at that time. Alternatively, instead of placing the video rental order at the kiosk itself, the customer may place the video rental order over the Internet or over a phone line via a series of prompts. In either of these cases, the customer must then go to the kiosk to receive the completed DVD.

Figure 2:
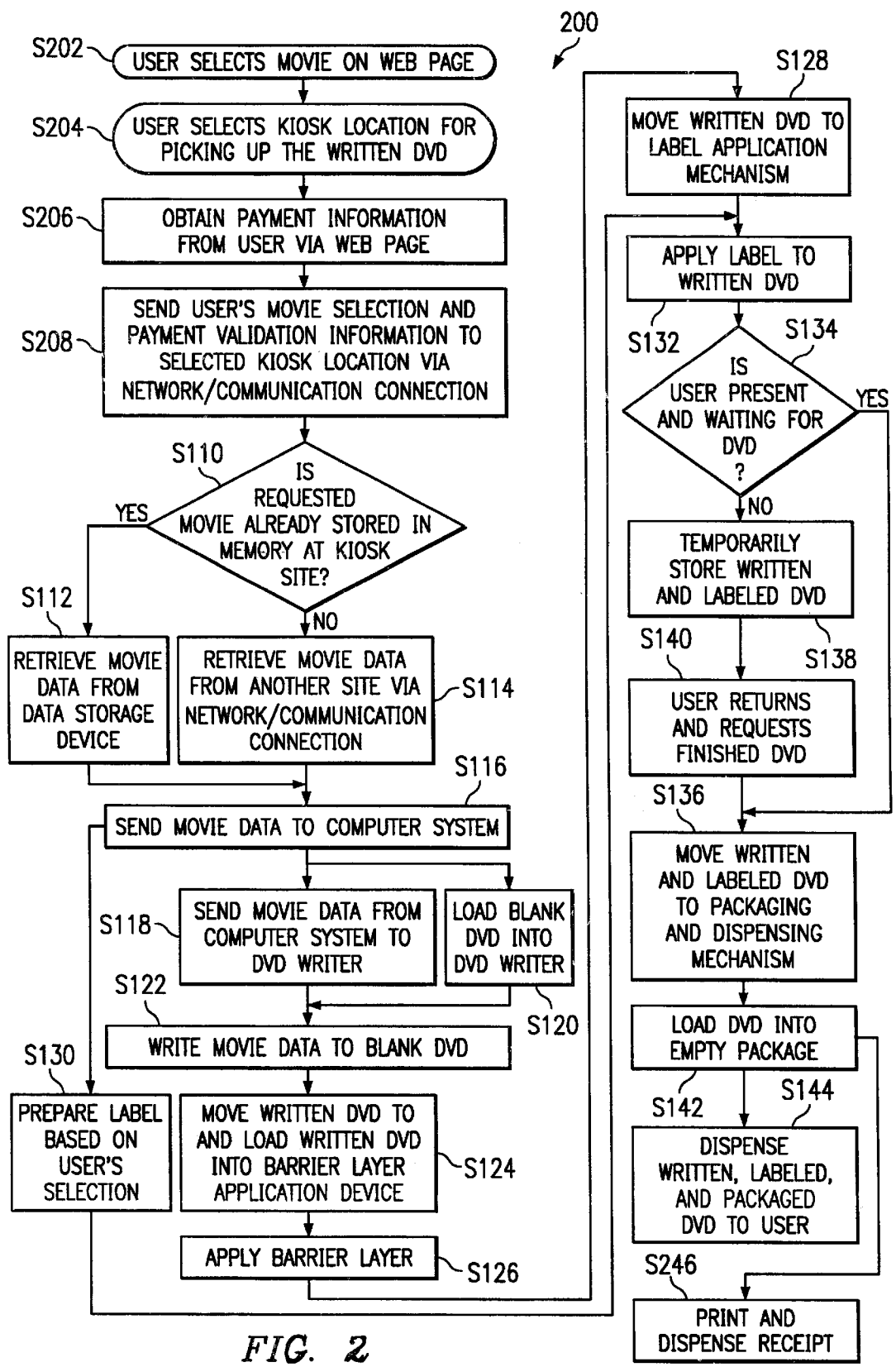
FIG. 2 is a flowchart of a second embodiment of the present invention.

In a second preferred embodiment, whose process 200 is shown in FIG. 2, the customer places the video rental order remotely. For example, the order can be placed over the Internet or via a telephone (e.g., wireless or landline). The Internet version will be discussed but the steps apply equally to other remote access techniques. As many of the steps involved in this second preferred embodiment are the same as those in the first preferred embodiment, like steps are denoted by like numbers and will not be described further.

In process 200, the customer selects the rental video using an interactive website over the Internet in step S202. As part of this process 200, the user also selects a kiosk location for receiving the completed DVD in step S204. Lastly, the customer enters payment information using the interactive website in step S206 and in return receives a confirmation number and/or an agreed upon password. Once this information has all been entered, the network/communication connection transfers it to the computer system at the selected kiosk in step S208. The remainder of process 200 is the same as process 100, with the exception that a receipt is printed and dispensed to the customer in step S246.

Figure 3A:
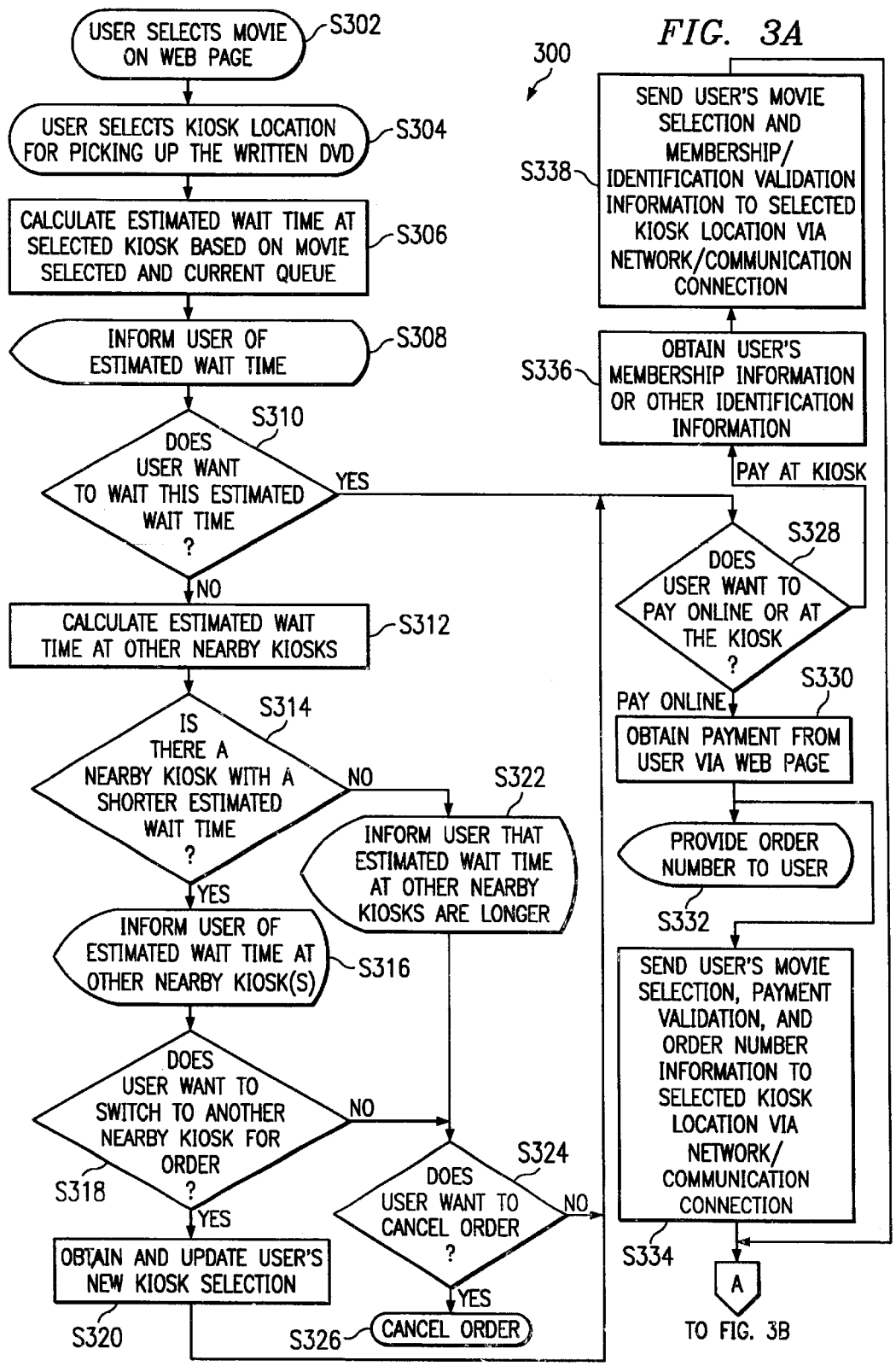
FIG. 3 is a flowchart of a third embodiment of the present invention.
Figure 3B:
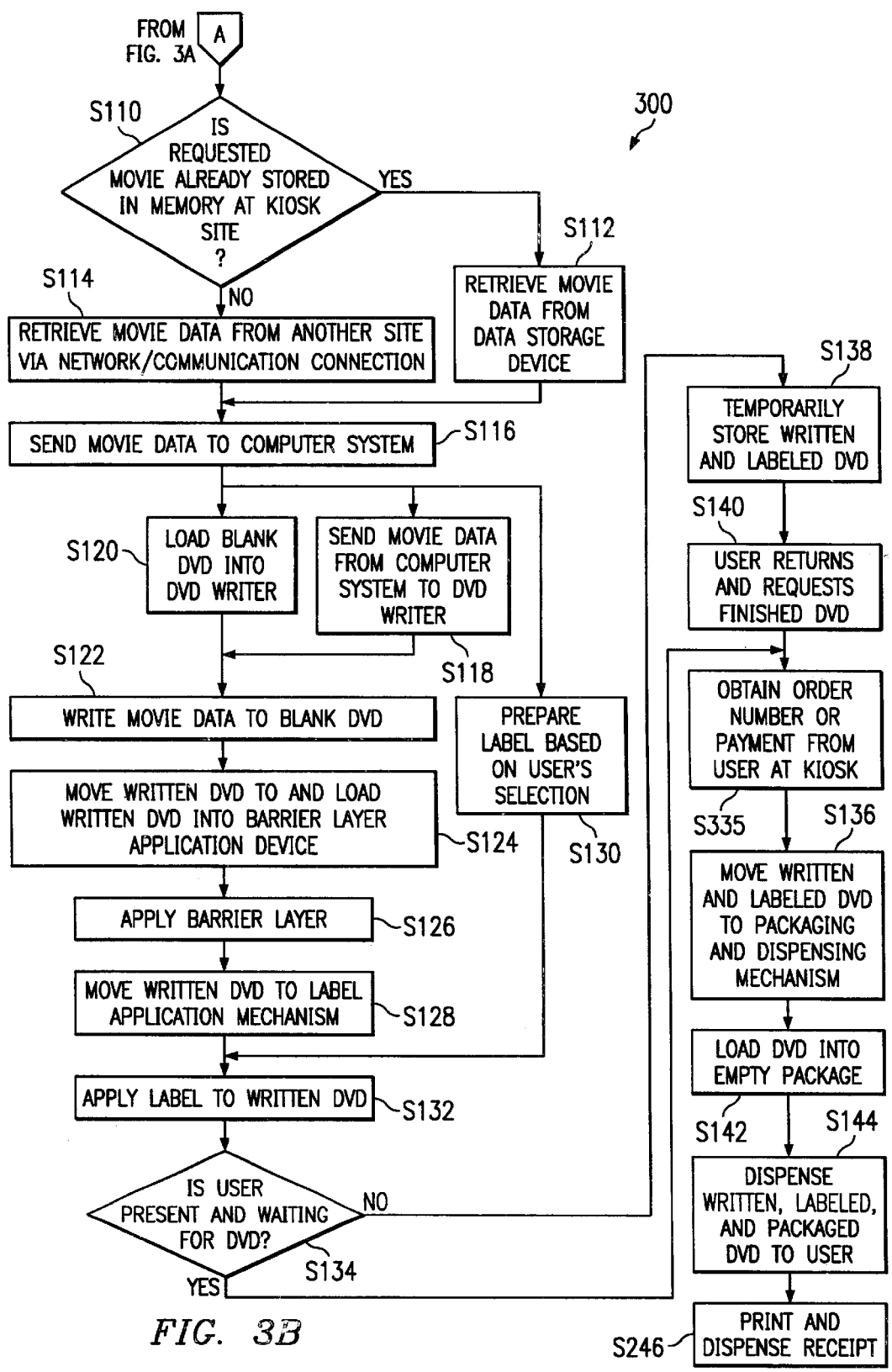

The process 300 shown in FIG. 3 is a third preferred embodiment. Like the process 200, the process 300 has much in common with the process 100 and thus identical steps are numbered identically and will not be discussed further.

In the process 300, the customer selects the rental video using an interactive website over the Internet in step S302 and selects a preferred kiosk location for receiving the completed DVD in step S304. The website host calculates an estimated wait time at the preferred kiosk in step S306 and informs the customer of the estimated wait time in step S308. The customer is then asked if this estimated wait time is too long in step S310. If the customer indicates the estimated wait time is too long, the website host calculates an estimated wait time at several nearby kiosks in step S312. The website host then determines if one of the nearby kiosks has a shorter estimated wait time than the preferred kiosk in step S314. If at least one of the nearby kiosks has a shorter wait time than the preferred kiosk wait time, the website host informs the customer of the estimated wait time at the nearby kiosks in step S316. In step S318, the website host gives the customer the option of changing preferred kiosks. If the customer desires to change preferred kiosks, the website obtains the new preferred kiosk selection in step S320.

If the website host determines there are no nearby kiosks with a shorter wait time, the website host informs the customer that no shorter estimated wait times are available in step S322. In step S324, the website host gives the customer the option of canceling the rental order. If the customer indicates a desire to cancel the rental order, the rental order is canceled in step S326. In step S318 if the customer indicated changing preferred kiosks was not acceptable, the customer is given the option to cancel the order in step S324.

If the original estimated wait time was acceptable, no kiosk locations had shorter estimated wait times or the preferred kiosk was changed, the customer selects between paying over the Internet or at the preferred kiosk in step S328. If the customer elects to pay over the Internet, the process 300 receives the user's payment information, such as a credit card account number, in step S330. The website host then provides an order number and/or an agreed upon password to the customer in step S332. All of the required information is then transmitted to the computer system at the preferred kiosk using the network/communication connection in step S334. If the customer elects to pay at the kiosk, the website host obtains the customer's membership information or other validation information in step S336. All of the required information, including the membership or other validation information, is transmitted to the computer system at the preferred kiosk in step S338. The completed DVD is created in the same manner as in the process 100. Receiving the completed DVD is slightly different in the process 300 in that the customer either enters the order number provided in step S332 or pays at the kiosk in step S335.

Figure 4:
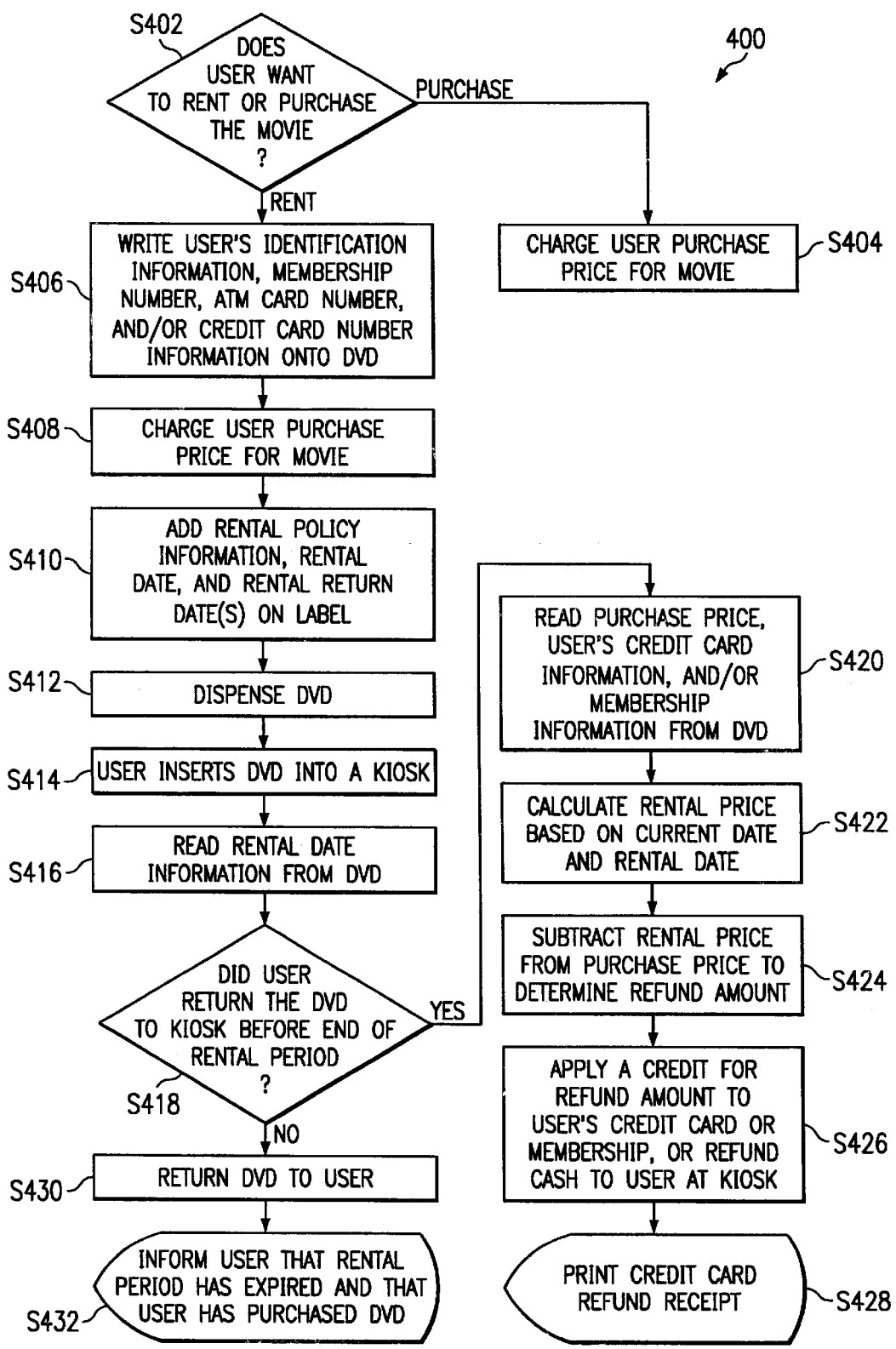
FIG. 4 is a flowchart of a fourth embodiment of the present invention.

In the fourth preferred embodiment, as shown by process 400 illustrated in FIG. 4, the customer is given the option of either renting or purchasing the written DVD. In step S402, the customer is queried whether the transaction will be a purchase or a rental. If the customer elects to purchase the DVD, the customer is charged the purchase price in step S404 and the DVD is written and dispensed as in the process 100, without the DVD receiving the opaquing layer applied in steps S124 and S126.

If the customer elects to rent the DVD, the customer's membership information, validation information, rental time and date and/or credit card information is written to the DVD in step S406. The customer is charged the video purchase price in step S408. The DVD is then written as in the process 100, with two exceptions. As with a purchased DVD, steps S124 and S126 are omitted, that is the opaquing layer is not applied to the DVD. Furthermore, the label will include additional information such as rental policy, return date, etc. The DVD is then dispensed in step S412.

The customer then returns to the kiosk after having watched the rented DVD and inserts the DVD into the DVD dispenser in step S414. The computer system then reads the rental time from the DVD in step S416 and determines if the customer returned the rented DVD within, the rental period in step S418. If the customer did return the DVD within the rental period, the computer system reads the customer's membership information, validation information, and/or credit card information from the DVD in step S420. The computer system calculates the rental price based upon the actual rental time in step S422. The computer system then subtracts the rental price from the purchase price in step S424 to determine a payment credit. The payment credit is then refunded to the customer's credit card or returned in cash to the customer at the kiosk via a change cup. If the payment credit is refunded to the customer's credit card, a receipt so indicating is printed in step S428. Of course, the credit card payments can be substituted with other payment methods such as debit cards, cash or checks. If the computer system in step S418 determines that the customer did not return the DVD prior to the end of the rental period, the DVD is returned to the customer in step S430. The computer system then informs the customer that the rental period had expired and that the customer has purchased the DVD in step S432 via a video screen and/or a printed receipt.

If the customer chooses to keep the DVD, she can simply decide not to return it. Since the full purchase price was originally charged, the system need to do nothing more. In one embodiment, the steps S402 and S428 (ask whether wish to purchase or buy, and charge if purchase) can be eliminated. In that embodiment, all DVDs will have the information written on it and the consumer can decide whether to keep at the time other than the time of purchase.

Figure 5:
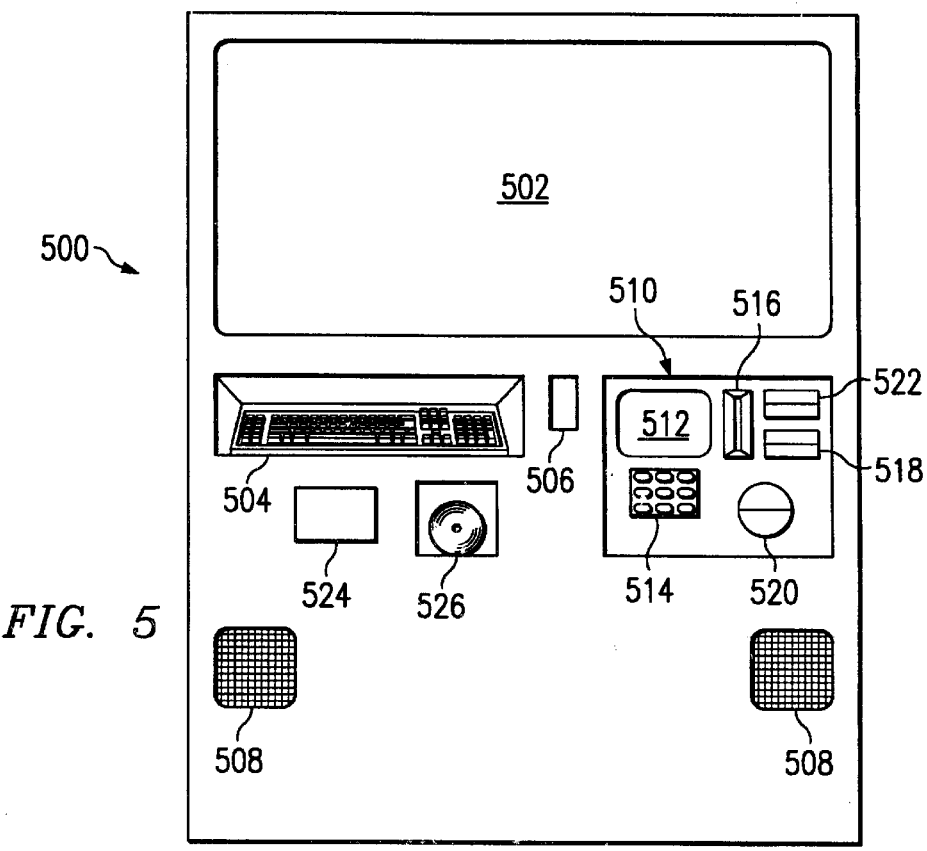
FIG. 5 illustrates a kiosk according to an embodiment of the present invention.

FIG. 5 shows a kiosk 500 that is compatible with the various preferred embodiments of the present invention. The kiosk 500 includes a video screen 502, a keyboard 504, a pointing device 506 and speakers 508. The kiosk 500 has a payment collection panel 510, which includes a first instruction panel 512, a keypad 514, a credit card reader 516, a currency detector 518, a change cup 520, and a receipt printer 522. Lastly, the kiosk 500 has a second instruction panel 524 and a DVD dispenser 526.

The video screen 502, the keyboard 504, the pointing device 506 and the speakers 508 allow a customer to interact with the kiosk 500 when selecting a video for rental or purchase. Preferably, the video screen 502 is a touch screen and the pointing device 506 is a mouse or a touch pad. Since both the touch screen and the pointing device provide for customer input, either could be eliminated. Advantageously, the display 502 can be used to show advertisements, previews or other media while the customers waiting.

The payment collection panel 510 provides a means for the customer to pay for a video rental or purchase, either by credit card, debit card or gift card via the credit card reader 516, or by cash via the currency detector 518. The customer receives a cash credit from the change cup 520 when appropriate. Alternatively, the customer can be mailed a check from a location remote from the kiosk 500. The customer receives a printed receipt from a receipt printer 522. The customer receives the rented video on a DVD from the DVD dispenser 526. When required, the customer returns the rented video to the DVD dispenser 526.

Figure 6:
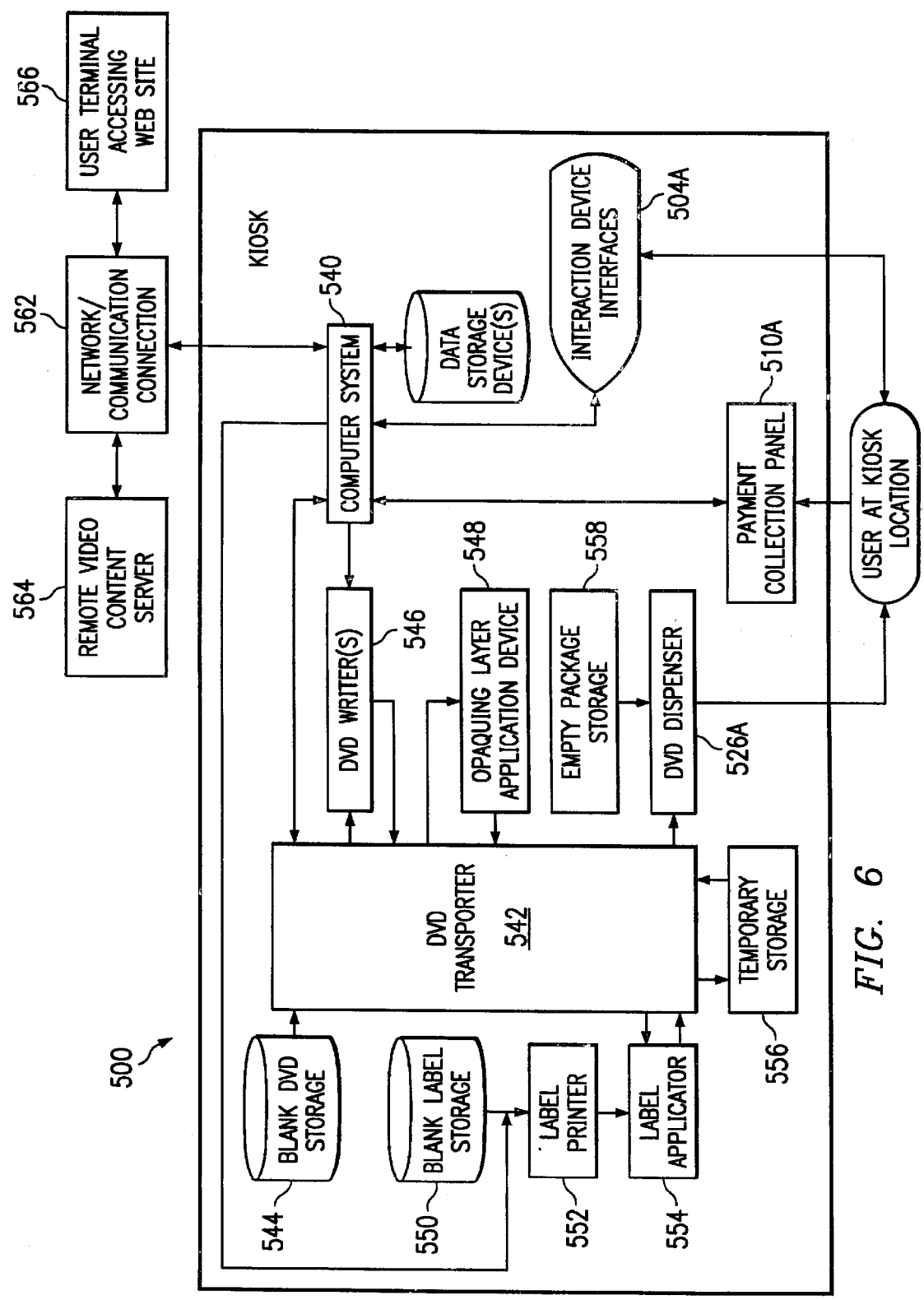
FIG. 6 is an overview of the internal elements of a kiosk according to an embodiment of the present invention.

FIG. 6 shows the internal elements of the kiosk 500, whose exterior is shown in FIG. 5. The customer interacts with the kiosk 500 through interaction device interfaces 504A with a computer system 540 that is connected to the various internal elements and controls their interaction. The customer further interacts with the kiosk through the payment collection panel 510A also connected to the computer system 540.

The computer system 540 controls a DVD transporter 542 that moves a DVD from one internal element to the next. Blank DVDs will be stored in a blank DVD storage unit 544. The DVD transporter 542 will move the blank DVD to a DVD writer 546. The DVD writer 546 is preferably capable of writing multiple DVDs at a single time. The DVD writer 546 receives the video content that will be written to the blank DVD from the computer system 540. Once the DVD has been written, the DVD transporter 542 moves the written DVD to an opaquing layer application device 548. Details regarding the opaquing layer will be described in greater detail below.

Blank labels for the written DVDs are stored in a blank label storage unit 550. A label printer 552 receives information, such as the title of the written DVD from the computer system 540. The DVD transporter 542 then moves the written DVD to a label applicator 554 that places the printed labels on the written DVD. The DVD transporter 542 then places the completed DVD into a temporary storage unit 556. When the customer is ready to receive the completed DVD, i.e., the rented video, the DVD transporter 542 moves the DVD to the DVD dispenser 526A. In the DVD dispenser 526A, the DVD is placed in an empty package that had been stored in an empty package storage unit 558. The packaged DVD is then provided to the customer.

When the customer first makes a video selection, the computer system 540 can determine if the video content is stored in a local video content server 560 within the kiosk 500. If the video content is not stored in the local video content server 560, the computer system 540 connects to a network/communication connection 562. The network/communication connection 562 receives the desired video content from a remote video content server 564 that can contain many thousands of videos in digital video content format and provides these to the computer system 540, which stores the video content on the local video content server 560. Preferably, the most frequently selected video content is stored on the local video content server 560. The most frequently selected video content can be updated either by the computer system 540, or remotely over the network/communication connection 562.

In certain preferred embodiments of the present invention, the customer may use the Internet to make a video selection. The customer visits the appropriate website via a computer 566, which can be located within the customer's home or apartment. The website is preferably located on a server which also functions as the network/communication connection 562. Once the customer has selected a video for rental or purchase, the customer goes to the kiosk 500 to receive the completed DVD.

The opaquing layer application device 548 places an opaquing layer on the DVD. The opaquing layer is an initially transparent coating placed upon the side of the DVD that is optically read. The opaquing layer becomes opaque due to the passage of time or exposure to air or light. When the opaquing layer becomes opaque, the DVD is no longer readable. Therefore, the DVD is not permanent, but has a predetermined life, as desired for a rental video. Once the opaquing layer has become opaque, the DVD is disposed or recycled and need not be returned to the kiosk 500. In certain preferred embodiments of the present invention, the DVD will be purchased, not rented. In those preferred embodiments, the opaquing layer is not applied.

Figure 7:
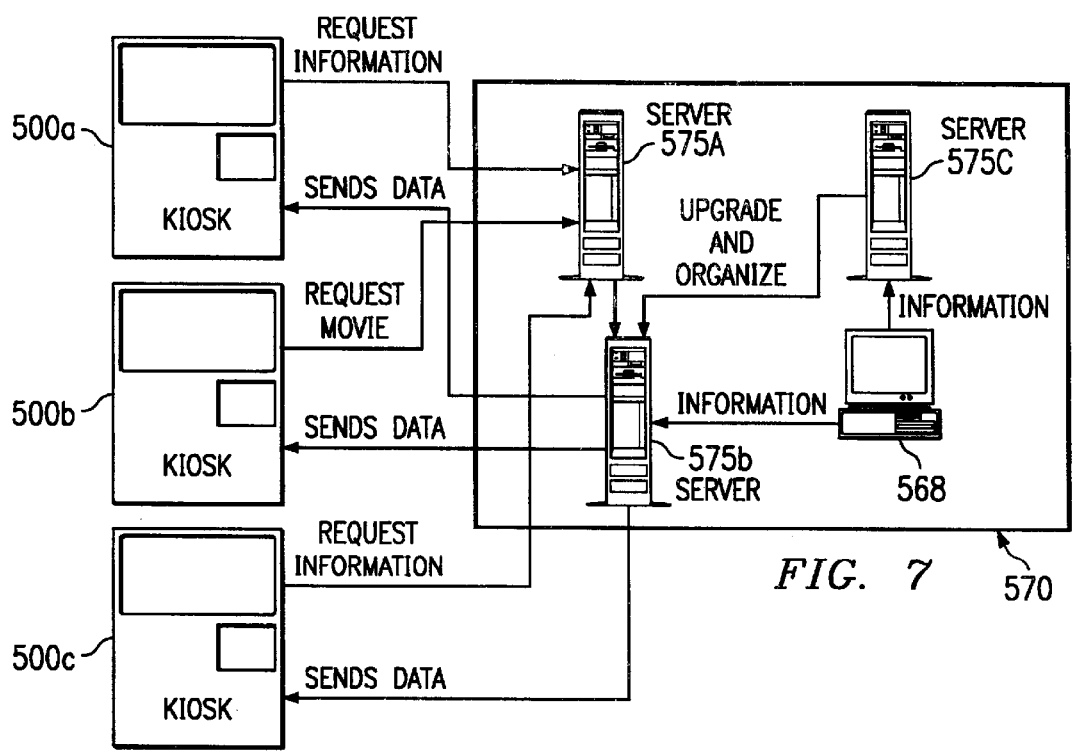
FIG. 7 is a diagram showing an embodiment system including a main office and various kiosks.

FIG. 7 shows a main office 570 for providing video content to various kiosks 500A, 500B, 500C and for hosting the website the customer can use to order videos. The main office 570 includes the network/communication connections that allow it to communicate with each of the various kiosks 500A, 500B, 500C. These communication connections are indicated by the various lines on the figure. FIG. 7 illustrates the main office 570 as being located in a single location. It is understood, however, that the main office may be distributed amongst many locations that could be physically far from one another (e.g., across a state, nationally or even internationally).

The main office 570 includes various equipment. Examples shown are a main computer 568 and servers 575A, 575B, 575C (in general, 575). Various functions of these computers will be discussed below to demonstrate operations that can occur with the present system. It is understood that various ones of these operations could be performed by other equipment in the system, could be modified, or could be eliminated.

In the preferred embodiment of the invention, certain of the movies will be stored locally at the kiosks 500 while others will be stored at the main office and transmitted to the kiosk upon demand. In an alternate embodiment, all of the movies will be stored at the kiosks thereby being readily available upon order. In this case, the main computer 568 could be used to upgrade new movies and cause the movies to be sent to the various kiosks 500. In another alternate embodiment, the kiosk stores none of the movies but rather sends a request whenever a movie is needed.

Various communications will occur between the kiosks 500 and the main office 570. These communication will include receiving requests from the various kiosks 500 for customer selected videos and transmitting the requested video content from the remote video content server (e.g., one or more of the servers 575). Other communications will provide account and financial information received from the various kiosks 500.

In a preferred embodiment, main computer 568 will control the network communication connections and the remote video content server. The computer 568 will keep track of sales for royalty payment purposes as well as membership information, and others. By using the computer 568, the various kiosks 500 can be remotely upgraded to store the most recent releases on their respective local video content servers 560.

A certain one or ones of the servers 560 can be used at file servers. The file servers will keep all movies on file in case any kiosk does not have a particular movie stored locally. The files will be kept organized and easy to find. Other server(s) will operate data servers, which send new information to the kiosks. These servers will also receive sales records to store in the main computer.

A number of alternatives to the preferred embodiments are envisioned. To promote sales, the computer system 540 can play clips of different videos on the video screen 502 and the speakers 508. These clips of different videos can include videos of movies or advertisements for products available at the grocery store, mall, etc., where the kiosk 500 is located. By placing a kiosk 500 in a pizza delivery store, the customer could order a pizza and a video all at one time for concurrent delivery. This is especially feasible as the pizza delivery store is not faced with the high inventory costs and space requirements of a traditional video rental store.

As noted above, a wide variety of digital content is available. This digital content can include videos, music and software such as games, etc. In another preferred embodiment, the software can be designed for use on a personal computer. In this embodiment, the kiosk 500 is placed in a store selling computers. The customer can then custom select the desired software for a new computer being purchased. Each software manufacturer could provide its own kiosk in this situation and provide custom software packages and pricing based on customer information. This customer information could include primary use for the new computer such as word processing, games, etc., and details regarding the new computer such as operating system, processor speed, amount of memory, hard disk size, etc.

The payment collection panel 510 can be modified to include a gift card dispenser. The customer would then be able to purchase gift cards from the kiosk 500 by using the keyboard 504 and the pointing device 506, etc. to enter a value amount for the gift card. The value amount could either be a fixed dollar value or be for a certain number of video rentals or purchases. Restrictions could also be placed on the gift card such as limiting the class of video that can be rented. The gift card could then be redeemed by reading the gift card with the credit card reader 516.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A method for providing a rented video on an optically readable medium, the method comprising:
   receiving a request for the rented video;
   at a point of sale, writing video content on the optically readable medium;
   at the point of sale, treating the optically readable medium with an opaquing layer, the opaquing layer designed to render the optically readable medium unreadable after a period of time; and
   at the point of sale, providing the rented video on the optically readable medium to a customer.

2. The method of claim 1, wherein the request for the rented video is received at the point of sale.

3. The method of claim 1, wherein the request for the rented video is received from a remote location different from the point of sale.

4. The method of claim 3, wherein the request for the rented video is received over the Internet.

5. The method of claim 3, wherein the request for the rented video is received over the telephone.

6. The method of claim 1, further comprising, before receiving the request for the rented video, storing video content on a local video content server at the point of sale.

7. The method of claim 6, further comprising, before storing video content on the local video content server at the point of sale, receiving the video content from a remote location.

8. The method of claim 1, further comprising, after receiving the request for the rented video, receiving the video content from a remote location.

9. The method of claim 1, further comprising after receiving the request for the rented video, providing an estimated time for providing the rented video to the customer at the point of sale.

10. An apparatus for providing a rented video on an optically readable medium, the apparatus comprising:

an electronic device to receive a request for the rented video;

an optically readable medium writer coupled to the electronic device, the optically readable medium writer for writing video content on the optically readable medium;

a coater coupled to receive the optically readable medium from the optically readable medium writer and to treat the optically readable medium with an opaquing layer, the opaquing layer designed to render the optically readable medium unreadable after a period of time;

a dispenser disposed to receive the optically readable medium with the opaquing layer, the dispenser providing the rented video on the optically readable medium to a customer; and an input device for receiving information from the customer, wherein the dispenser provides the optically readable medium to the customer only upon authentication of the received information.

11. The apparatus of claim 10, wherein the electronic device is selected from the group consisting of a touch screen, a keyboard, a pointing device, and combinations thereof.

12. The apparatus of claim 10, wherein the electronic device receives the request for the rented video from a remote location, the remote location remote relative to a location of the apparatus.

13. The apparatus of claim 12, wherein the request for the rented video is received over the Internet.

14. The apparatus of claim 12, wherein the request for the rented video is received over a telephone.

15. The apparatus of claim 10, further comprising a local video content server for storing video content.

16. The apparatus of claim 15, further comprising an input port coupled to a remote video content server, wherein video content is received from the remote video content server and stored on the local video content server.

17. The apparatus of claim 16, wherein the video content is received from the remote video content server after the request is received at the electronic device.

18. The apparatus of claim 16, wherein the video content is received from the remote video content server before the request is received at the electronic device.

19. The apparatus of claim 10, wherein the electronic device, the optically readable medium writer, and the coater are disposed within a housing, the apparatus further comprising a display coupled to the housing and viewable by the customer.

20. The apparatus of claim 19, wherein the display displays advertisements.

21. The apparatus of claim 10, further comprising a gift card dispenser.

* * * * *